United States Patent [19]

Ohara et al.

[11] Patent Number: 4,689,780
[45] Date of Patent: Aug. 25, 1987

[54] OPTICAL RECORDING AND REPRODUCING HEAD

[75] Inventors: Shunji Ohara, Higashiosaka; Tomio Yoshida, Katano; Isao Satoh, Neyagawa; Kenji Koishi, Hyogo, all of Japan

[73] Assignee: Matsushita Electric Industrial Company, Ltd., Osaka, Japan

[21] Appl. No.: 773,674

[22] Filed: Sep. 9, 1985

Related U.S. Application Data

[63] Continuation of Ser. No. 513,247, Jul. 13, 1983, Pat. No. 4,564,931.

[30] Foreign Application Priority Data

Jul. 15, 1982 [JP] Japan .............................. 57-123807
Jul. 15, 1982 [JP] Japan .............................. 57-123809

[51] Int. Cl.[4] ..................... G11B 7/095; G11B 7/135
[52] U.S. Cl. ...................... 369/44; 369/112; 369/111; 369/110; 369/46; 350/286; 350/402
[58] Field of Search ............... 369/112, 111, 110, 44, 369/46; 350/173, 286, 401, 402

[56] References Cited

U.S. PATENT DOCUMENTS

| | | | |
|---|---|---|---|
| 4,429,378 | 1/1984 | Sato | 369/110 |
| 4,505,584 | 3/1985 | Kato | 369/46 |
| 4,542,492 | 9/1985 | Leterme | 369/110 |
| 4,573,149 | 2/1986 | Deguchi | 369/43 |

OTHER PUBLICATIONS

"Integrated Autofocusing System and Method of Manufacture", by Gaston, IBM Tech. Disc. Bull., vol. 23, No. 5, Oct. 1980, pp. 1906-1908.

*Primary Examiner*—Alan Faber
*Attorney, Agent, or Firm*—Spencer & Frank

[57] ABSTRACT

A light beam emitted from a semiconductor laser passes through optical elements which include a condenser lens, a magnifier prism, and a focussing lens to obtain a substantially circular spot of light on a disc. The magnifier prism is constructed such that only the narrower cross-section of the elliptical light beam emitted from the condenser lens is magnified by the incidence surface of the magnifier prism to obtain a substantially circular light beam. The light beam thus obtained is reflected by the prism so that it becomes substantially perpendicular to the beam emitted from the condenser lens. After reflection by the disc, the light passes through a splitter prism. The splitter prism has a reflecting surface and a transmitting surface which spatially bisect the light beam reflected from the disc, a lens and other components. The bisected portions of the beam fall on a photodetector for focussing control and a photodetector for tracking control.

17 Claims, 11 Drawing Figures

OPTICAL RECORDING AND REPRODUCING HEAD

This application is a continuing application based on Ser. No. 513,247 filed July 13th, 1983, now U.S. Pat. No. 4,564,931.

BACKGROUND OF THE INVENTION

The present invention relates to an optical disc unit and more particularly to an optical system wherein light beams from two light sources are combined and applied to an information medium, and the light beams reflect therefrom are drawn out in such a way that they are separated from each other.

Recently, an optical disc unit has been proposed in which a semiconductor laser is employed as a light source, and the laser beam therefrom is focussed into a microbeam of light not larger than 1 μm and applied to a disc-shaped information medium having a photosensitive material deposited thereon by evaporation thereby to record and reproduce video signals or digital signals in the form of concentric or spiral shapes.

An example of a unit of this kind may be such that two laser beam sources are provided, and both laser beams therefrom are simultaneously focussed and applied onto the disc close to each other.

Examples of such a unit include the following: One example is such that one of the laser beams is focussed into a microspot of light of oval shape which is long in the direction of the track and is employed to erase the record in the track, while the other beam is focussed into a substantially circular microspot of light on the disc and is employed to effect recording and reproduction. Another example is such that one of the laser beams is employed to apply a thermal bias, while the other laser beam is employed to effect recording. Still a further example is such that both the laser beams are focussed into substantially circular microspots of light on the disc, and one of the microspots of light is employed to record and at the same time, the other microspot of light is employed to read out the recorded signal and reproduce the same instantaneously, thereby making it possible to check for whether a correct recording has been effected or not.

FIG. 1 shows an example of a typical conventional optical recording and reproducing unit having two light sources. More specifically, a laser beam 1a from a first light source 1 is passed through an afocal lens system 2, bent by a mirror 3 and focussed on a disc 5 by a focussing lens 4. On the other hand, a laser beam 6a emitted from a second light source 6 is passed through a lens 7 as well as a half-mirror 8, bent by the mirror 3 and focussed on the disc 5 by the focussing lens 4. Reflected light 6b from the disc 5 emanates from the half-mirror 8 and is led into a photodetector 9 for obtaining known focus and tracking control signals and a reproducing signal for reading out information recorded on the disc 5.

In such a method for composing both laser beams together while spatially keeping the beams separate from each other so that their respective optical paths do not interfere with each other, one of the laser beams (e.g., 6a) must enter at a considerably oblique angle with respect to the optical axis of the focussing lens 4, so that it is possible to effectively utilize the opening of the focussing lens 4. As a result, much light may be rejected, or an aberration may be generated resulting in deterioration of the focussing performance of the focussing lens 4.

Moreover, the semiconductor laser generally has an anisotropic divergent angle, which is different for directions perpendicular and parallel to the composition surface thereof, so that the optical system for focussing a circular microspot of light on the disc becomes undesirably complicated Accordingly, when semiconductor lasers are employed for both light sources, the optical system inevitably becomes large and complicated. In addition, since the laser beams have large diameters, it is difficult to combine both beams while keeping their optical paths spatially separate from each other.

In the arrangement shown in FIG. 1, it is also difficult to separate the reflected light of both laser beams from the disc, so that the reflected light which is emitted from the other light source (the first light source 1) may undesirably be returned and led to the photodetector 9 to exert adverse effects on the controlling performance and reproducing signals.

SUMMARY OF THE INVENTION

An object of the invention is to provide an optical head which comprises a condenser lens converging the light beam emitted from a semiconductor laser into a parallel ray light beam, and a prism (hereinafter, referred to as a "magnifier prism") having one or more incidence surfaces for enlarging the narrower cross-section of the parallel ray light beam and one or more total reflection surfaces for reflecting the light beams in the direction substantially orthogonal or substantially parallel to the parallel ray light beam. This construction permits the optical head to be miniaturized since the optical axis of the light beam emitted from the semiconductor laser and that of the light beam having emerged from the magnifier prism can be made substantially orthogonal or parallel to each other.

Another object of the present invention is to provide a miniaturized optical head in which the magnifier prism, lens and other elements are so disposed that the optical axis of the light beam emerging from a lens for converging the light beam reflected from a disc is made substantially parallel to that of the parallel ray light beam emerging from the condenser lens.

Still another object of the present invention is to provide an optical head having a simple arrangement through which servo signals are obtained, and which is realized by a prism (hereinafter, referred to as a "splitter prism") having a totally reflecting surface and a transmitting surface for substantially and spatially bisecting the light beam reflected from the disc, and a semi-convex lens divided substantially into two halves along the optical axis thereof for focussing one of the light beam portions thus obtained.

Other objects, features and advantages of the invention will become apparent from the following descriptions when taken in connection with the accompanying drawings.

BRIEF DESCRIPTION OF THE DRAWINGS

FIGS. 2a to 2d are schematic views illustrating an embodiment of the present invention, in which FIG. 2a is a plan view viewed from the disc side, FIG. 2b and FIG. 2c are a side view and a front elevational view, respectively, and FIG. 2d is a perspective view;

FIGS. 5a and 5c are schematic views illustrating the basic concept of still another embodiment of the present invention, in which FIG. 5a is a plan view, FIG. 5b is a side view and FIG. 5c is a front elevational view.

DESCRIPTION OF THE PREFERRED EMBODIMENTS

Preferred embodiments of the invention will be described hereinunder with reference to the accompanying drawings.

Figure 1:
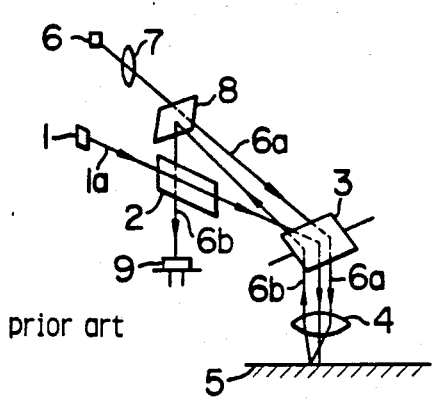
FIG. 1 is a schematic view illustrating the basic concept of a conventional optical recording and reproducing head.
Figure 2A:
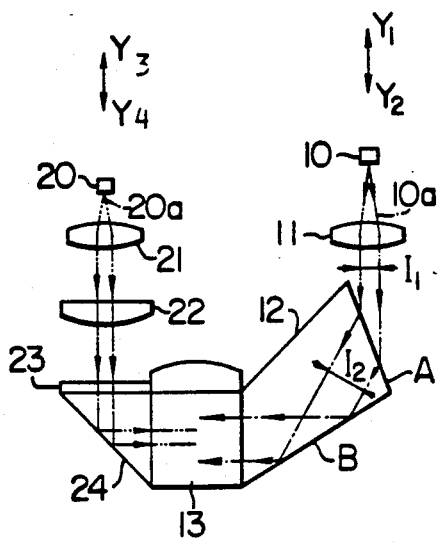
Figure 2B:
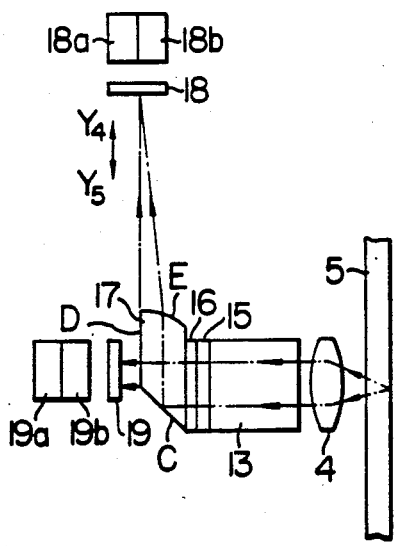
Figure 2C:
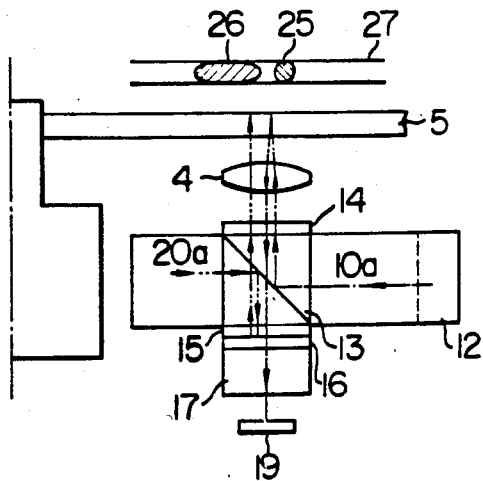
Figure 2D:
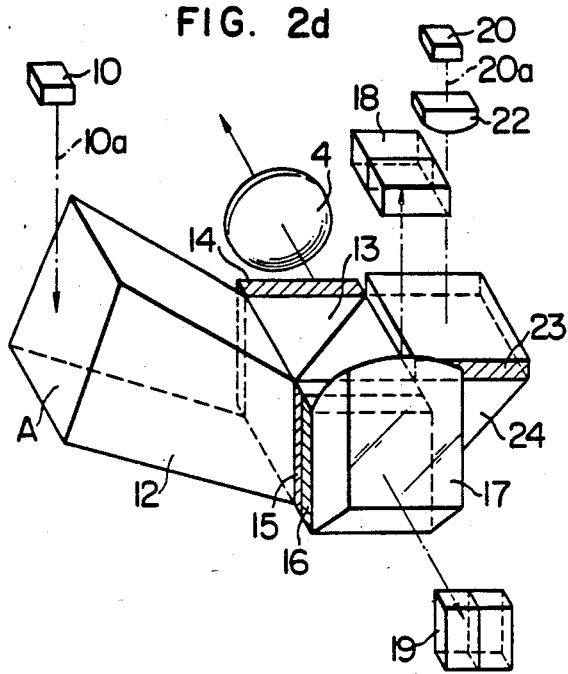

FIGS. 2a to 2d in combination show an embodiment of the invention in which FIG. 2a is a plan view viewed from the disc side, FIG. 2b is a side elevational view, FIG. 2c is a front elevational view and FIG. 2d is a schematic perspective view. Referring first to FIGS. 2a to 2c, a semiconductor laser 10 as a first light source is adapted to output a light beam 10a having a wavelength $\lambda_1$. The light beam 10a from the first light source 10 is focussed into, for example, a substantially circular microspot of light on the disc and is employed for recording and reproduction as well as detection of servo signals, such as focus and tracking control signals. In general, the semiconductor laser capable of high-output oscillation has a divergent angle of rays which are different in the directions perpendicular and parallel to the composition surface thereof and hence has an anisotropic far-field pattern. Accordingly, the semiconductor laser requires an optical system adapted to change the light beam diameter for forming a circular and isotropic microspot of light on the disc while suppressing the light loss.

A magnifier prism 12 is an element for changing the light beam diameter. More specifically, the light beam 10a formed into a parallel light beam by a condenser lens 11 is refracted by an end surface A of the prism 12. At the time, the width $I_1$ of the light beam entering the prism 12 is multiplied by m to change into a light beam width $I_2$. The multiplier m is represented by the following formula:

$$m = I_2/I_1 = \cos \theta_2/\cos \theta_1 \ldots \quad (1)$$

where $\theta_1$ is the incident angle to the prism 12, and $\theta_2$ is the refraction angle at the end surface A. Accordingly, by passing the light beam through the prism 12, the diameter of the light beam in the direction parallel to the composition surface of the semiconductor laser can be mutliplied by m so as to be substantially equal to the diameter of the light beam in the direction perpendicular to the composition surface. Thereby, it is possible to obtain an isotropic and circular microspot of light on the disc. In addition, there is substantially no light loss in this operation.

The light beam thus multiplied in width by m at the end surface A is totally reflected by an end surface B of the prism 12 and bent so as to be substantially perpendicular to the optical axis $Y_1-Y_2$ of the first light source of the light beam entering the prism 12. It is to be noted that, in order to allow the light beam to efficiently enter the prism 12 through the end surface A thereof, it is desirable to dispose the light source 10 so that the light beam 10a can be incident on the end surface A as p-polarized light.

Since the first light source is disposed so that the light beam 10a totally reflected by the end surface B will enter a polarization beam splitter 13 as s-polarized light, the light beam 10a is reflected by the polarization beam splitter 13 with a reflection angle of 90°, as clearly shown in FIG. 2c, and is then passed through a first quarter wave plate 14 and a focussing lens 4 to focus a substantially circular microspot of light 25 on a disc 5. By means of the microspot of light focussed to be substantially circular, for example, a signal is recorded onto the disc, or a signal thereon is reproduced.

On the other hand, the light reflected from the disc 5 is passed through the focussing lens 4 and the first quarter wave plate 14 so that the polarization direction thereof is rotated 90°. Then the reflected light is passed through the polarization beam splitter 13, a second quarter wave plate 15 and a first optical filter 16 and is then split by a splitter prism 17, described later, and led to photodetectors 18 and 19. The first filter 16 is an optical filter that transmits the light beam of wavelength $\lambda_1$ nearly 100% but reflects the light beam of wavelength $\lambda_2$ nearly 100%.

The following is a description of the optical path of the light beam emitted from a second light source 20. A light beam 20a from the second light source 20 is shaped to have, for example, an oval cross section which is long in the direction of the track on the disc, and is employed for erasing.

The light beam 20a from the second light source 20 constituted by a semiconductor laser is condensed by a condenser lens 21 and reduced in beam diameter in the direction perpendicular to the composition surface of the semiconductor laser by means of a cylindrical lens 22 having a lens effect only in the direction perpendicular to the composition surface of the semiconductor laser. A second filter 23 is an optical filter that transmits the light beam of wavelength $\lambda_2$ nearly 100% but reflects the light beam of wavelength $\lambda_1$ nearly 100%. The second filter is employed to remove the light energy of a component of wavelength $\lambda_1$ included in the light beam 20a. After passing the second filter 23, the light beam 20a is passed through a rectangular prism 24 to change the optical path thereof and is then made incident on the polarization beam splitter 13 as s-polarized light. The light beam 20a is reflected by the polarization beam splitter 13, and passed through the second quarter wave plate 15 and is then led to the first filter 16. The first filter 16 is, as described hereinbefore, an optical filter that reflects the light beam of wavelength $\lambda_2$ nearly 100%. The light beam 20a reflected by the first filter 16 is passed through the second quarter wave plate 15 again so that the polarization direction thereof is changed. Then the light beam 20a is passed through the polarization beam splitter 13 and the first quarter wave plate 14 and focussed by the focussing lens 4 into a microspot of light 26 of oval shape which is long in the direction of the track 27.

As described above, the microspot of light 25 of substantially circular shape and the microspot of light 26 of oval shape are formed substantially along the optical axis of a single focussing lens 4. Therefore, both light loss and aberration are small, and both the microspots of light 25, 26 can be disposed on the same track 27 on the disc close to each other. In practice, for example, the microspot of light 25 of substantially circular shape is employed to record and reproduce a signal, while the microspot of light 26 of oval shape is employed to erase.

On the other hand, the light beam which is emitted from the second light source and reflected from the disc is directed toward the magnifier prism 12 by the effect of the first quarter wave plate 14, unlike the light beam from the first light source. Accordingly, only the light beam which is emitted from the first light source and reflected from the disc is received by the photodetectors 18, 19; hence, the light beam from the second light source has no adverse effect on the photodetectors.

The optical disc unit described above requires servo signals for controlling focussing and tracking. Both the servo signals are formed from the light beam which is emitted from the first light source and reflected from the disc 7, through the splitter prism 17.

The splitter prism 17 is constituted by a reflecting surface C, a transmitting surface D and a half-convex lens E formed by substantially halving a convex lens along the optical axis thereof. Thus, the light beam which is emitted from the first light source and reflected by the disc is halved by the reflecting surface C and the transmitting surface D. One of the halved reflected-light beam portions which is reflected by the reflecting surface C is focussed by the half-convex lens E and led to the photodetector 18, while the other of the halved reflected-light beam portions which is transmitted by the transmitting surface is led to the photodetector 19.

The photodetector 18 is disposed at substantially the image formation position of the one half of the reflected light beam. The photodetector 18 is divided into two parts 18a, 18b as viewed from the incidence surface thereof. The servo signal for the focus control is obtained from the difference between the outputs of the photodetector parts 18a and 18b.

On the other hand, the photodetector 19 is divided into two parts 19a, 19b as viewed from the other half of the reflected light beam. The servo signal for the tracking control is obtained from the difference between the outputs of the photodetector parts 19a and 19b.

According to the construction of the invention, the splitter prism 17 is disposed so that the optical axis $Y_4-Y_5$ of the half-convex lens E which is relatively long is substantially parallel to the optical axes $Y_1-Y_2$, $Y_3-Y_4$ of the optical axes of both light sources. Therefore, it is possible to reduce the size of the recording and reproducing head itself.

It is to be noted that, as described above, the second filter 23 is adapted to remove the light energy of a component of wavelength $\lambda_1$ included in the light beam from the second light source thereby to prevent the light beam from the second light source from entering the photodetectors; therefore, it is obvious that the second filter 23 is not required if the wavelengths $\lambda_1$ and $\lambda_2$ are largely separate from each other and the light energy of the light beam from the second light source does not include any component of wavelength $\lambda_1$.

Moreover, the cylindrical lens 22 is employed for obtaining on the disc the microspot of light 26 of oval shape which is as long in the direction of the track as possible. Since the emitting surface of the semiconductor laser originally has an oval shape (e.g., 1 $\mu m \times 4$ $\mu m$), the invention is able to obtain on the disc a microspot of light of oval shape which is somewhat long even if the cylindrical lens 22 is not provided.

Although the embodiment of the invention of FIGS. 2a to 2d shows the method wherein the beam diameter is magnified by employing the magnifier prism 12, it is also possible to magnify the beam diameter by a combination of concave and convex cylindrical lenses as shown in FIG. 3.

Figure 3A:
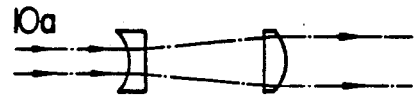
FIGS. 3a and 3b are views illustrating the basic concept of a cylindrical lens system for shaping the light beam from a first light source.
Figure 3B:

FIG. 3a shows the optical path as viewed from the direction parallel to the composition surface of the semiconductor laser as the first light source, while FIG. 3b shows the optical path as viewed from the direction perpendicular to the composition surface.

Figure 4:
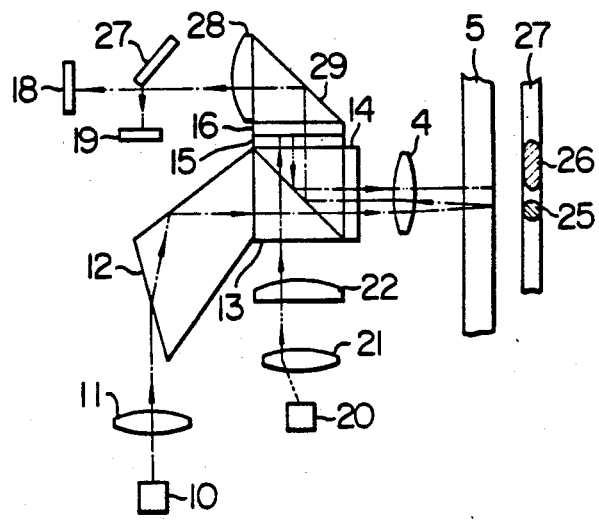
FIG. 4 is a schematic view illustrating the basic concept of another embodiment of the present invention.

FIG. 4 shows another embodiment of the invention. The same elements and parts in this embodiment as those in the embodiment shown in FIG. 2 are represented by the same reference numerals as shown in FIG. 2. Although the embodiment shown in FIG. 2 is arranged such that the light beams from the two light sources are made incident on the polarization beam splitter as s-polarized light, the embodiment shown in FIG. 4 is arranged such that the light beams from the two light sources are made incident on the polarization beam splitter as p-polarized light. Therefore, the embodiment of FIG. 4 has the same effect as that of the embodiment of FIG. 2 although the former differs from the latter only in that the light beam to be reflected or transmitted by the polarization beam splitter in the embodiment of FIG. 2 is transmitted or reflected in the embodiment of FIG. 4. It is to be noted that, in FIG. 4, the light beam passed through the filter 16 is led by a rectangular prism 29, a convex lens 28 and a splitter mirror 27 to the photodetectors 18, 19 for obtaining known focus and tracking control servo signals and reading out reproducing signals from the disc.

In either of the embodiment shown in FIGS. 2a to 2d or the embodiment shown in FIG. 4, the relationship between the wavelengths $\lambda_1$ and $\lambda_2$ is desirable to be $\lambda_1$, $\lambda_2$. This is because the diameter of the microspot of light focussed by the focussing lens is proportional to the wavelength, and the shorter the wavelength, the smaller the diameter of the microspot of light. Therefore, as the light source 1 emitting the light beam for obtaining reproducing signals and servo signals by focussing the light beam into a substantially circular microspot of light and detecting the reflected light, it is preferable to employ a light source emitting a light beam having a short wavelength $\lambda_1$ for obtaining signals excellent in quality up to high frequencies.

Figure 5A:
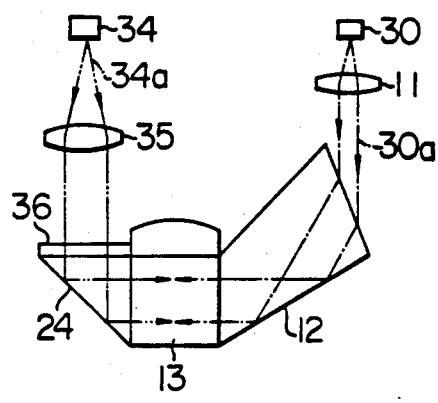
Figure 5B:
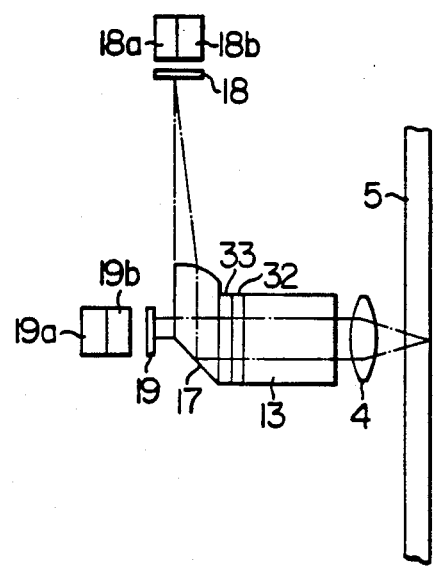
Figure 5C:
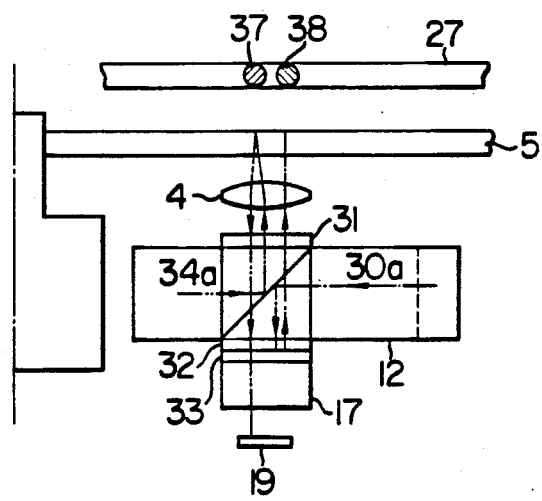

FIGS. 5a to 5c in combination show still another embodiment of the invention which adopts the two-beam system allowing reproduction to be effected immediately after recording and the recorded signal to be monitored. The same elements and parts in the embodiment shown in FIGS. 5a to 5c as those in the embodiments shown in FIGS. 2a to 2d and FIG. 4 are represented by the same reference numerals as those in FIGS. 2a to 2d and FIG. 4. It is to be noted that FIG. 5a is a plan view viewed from the disc side, FIG. 5b is a side elevational view, and FIG. 5c is a front elevational view.

First, the optical path of the light beam from the first light source will be described hereinunder. The first light source is constituted by a semiconductor laser emitting a light beam of wavelength $\lambda_3$, the output light beam from which is condensed by the condenser lens 11 and made incident on the magnifier prism 12, where the light beam is magnified in beam diameter only in the direction parallel to the composition surface of the semiconductor laser. The light beam enters the polarization beam splitter 13 as s-polarized light. After being reflected, the light beam passes a second quarter wave plate 32 and enters a first filter 33 (see FIG. 5c). The second quarter wave plate 32 has a quarter wave plate effect on the wavelength $\lambda_3$ of the light beam from the first light source, while the first filter 33 reflects the light beam of wavelength $\lambda_3$ nearly 100% but transmits the light beam of wavelength $\lambda_4$ from the second light source nearly 100%. Accordingly, the light beam which is emitted from the first light source and enters the first filter is reflected thereby and changed in the polarization direction, and is then passed through the polarization beam splitter 13. After passing a first quarter wave plate 31, the light beam is focussed substantially along the optical axis of the focussing lens 4 to form a substantially circular microspot of light 38 on the disc 5. The microspot of light 38 is employed for recording a signal, for example. On the other hand, the light beam which is emitted from the first light source and reflected from the disc 5 is not received by the photodetectors 18, 19 owing to the effect of the quarter wave plate 31 and the characteristics of the first filter 33.

The following is the description of the optical path of the light beam from the second light source. The second light source is constituted by a semiconductor laser emitting a light beam of wavelength $\lambda_4$. In the output light beam therefrom, only a light beam portion near the center and having a substantially circular cross section is condensed by a condenser lens 35 of small NA (e.g., not larger than 0.25) in order to focus a substantially circular microspot of light on the disc. The second filter has characteristics such that it transmits the light beam of wavelength $\lambda_4$ nearly 100% but reflects the light beam of wavelength $\lambda_3$ nearly 100%. By passing the light beam through the filter, the light energy of a component of wavelength $\lambda_3$ included in the light beam from the second light source is removed. The second filter is employed for preventing the light beams from mixing with each other on the photodetectors. Therefore, the second filter is not required if the wavelengths of the light beams from both the light sources are sufficiently separate from each other (e.g., 632.8 nm and 850 nm) and each light beam includes a sufficiently small amount of light energy of the wavelength of the other. The light beam which is emitted from the second light source and is made incident on the polarization beam splitter 13 as s-polarized light is reflected and then passed through the first quarter wave plate 1 and is focussed substantially along the optical axis of the focussing lens 4 to form a substantially circular microspot of light 37 on the disc.

The light beam which is emitted from the second light source and reflected from the disc 5 is changed in polarization direction owing to the effect of the first quarter wave plate 31 and passed through the polarization beam splitter and is then led through the splitter prism 17 to the photodetectors 18, 19. The microspots of light 36 and 37 are disposed on the same track 27 close to each other. Thus, the signal recorded by the microspot of light 36 can immediately be monitored and checked by means of the microspot of light 37. In addition, the servo signals for known focus and tracking control are also obtained from the light beam which is emitted from the second light source and reflected from the disc.

In view of the arrangement of the present invention mentioned above, the narrower laser beam from the semiconductor is magnified or enlarged by the magnifier prism and the resultant light beam is totally reflected at a specified angle so as to make the optical axis of the light beam from the condenser lens substantially orthogonal or parallel to that of the light beam which emerged from the magnifier prism. As a result, neither optical axes flare to any appreciable degree so as to minimize any useless space. Thus, it is possible to miniaturize the optical head.

Further, according to the invention, the use of the magnifier prism makes it possible to make the optical axis of the parallel ray light beam emitted from the condenser lens, which is relatively difficult to shorten, substantially parallel to that of the light beam reflected from the disc for obtaining a focussing control signal. For this reason, any unnecessarily enlarged or widened space is eliminated, permitting miniaturizing the optical head.

Further, according to the construction of the invention, the reflected light beam is separated by means of the integrated splitter prism so as to obtain servo signals for focussing and tracking controls. Therefore, it is possible to eliminate the adverse or undesirable effects upon both servo signals due to, for example, displacements of the optical head.

Further, according to the construction of the invention, the focussing lens and the tracking photodetector can be disposed with the splitter prism interposed therebetween. This makes it easy simultaneously to move both the focussing lens and the photodetector when conducting tracking. This makes it possible to widen the area within which tracking can be effected.

Although the invention has been described in specific terms, it is to be noted here that the described embodiments are not exclusive and various changes and modifications may be imparted thereto without departing from the scope of the invention which is limited solely by the appended claims.

We claim:

1. An optical head comprising
   a light beam source;
   a condenser lens for converging the light beam emitted from said light beam source thereby forming a parallel light beam;
   a magnifier prism having at least one incidence surface for enlarging only one unidirectional width of said parallel ray light beam and at least one reflecting surface for reflecting said enlarged parallel ray light beam; and
   a focussing lens for focussing said enlarged parallel light beam onto a disc,
   wherein said incidence surface and reflecting surface of said magnifier prism are disposed so that said parallel ray light beam incident upon said incidence surface and said parallel ray light reflected from said reflecting surface define an angle of substantially 90° therebetween.

2. An optical head as set forth in claim 1, wherein said incidence surface is provided with a film having a small reflection loss with respect to the incident angle and wavelength of said parallel ray light beam incident thereupon, said reflecting surface being provided with a film having a small transmission loss with respect to the incident angle and wavelength of said parallel ray light incident thereupon.

3. An optical head as set forth in claim 2, wherein said light beam source is disposed so that said parallel ray light beam is incident upon the incident surface of said magnifier prism as p-polarized light.

4. An optical head as set forth in claim 2, which further comprises a converging lens for converging the light beam reflected from said disc, whereby said condenser lens and said converging lens are disposed so that the optical axis of said parallel ray light beam from said condenser lens and that of the light beam emerging from said lens are substantially parallel to each other.

5. An optical head as set forth in claim 1, wherein said light beam source is disposed so that said parallel ray light beam is incident upon the incident surface of said magnifier prism as p-polarized light.

6. An optical head as set forth in claim 5, which further comprises a converging lens for converging the light beam reflected from said disc, whereby said condenser lens and said converging lens are disposed so that the optical axis of said parallel ray light beam from said condenser lens and that of the light beam emerging from said lens are substantially parallel to each other.

7. An optical head as set forth in claim 1, which further comprises a converging lens for converging the light beam reflected from said disc, whereby said condenser lens and said converging lens are disposed so that the optical axis of said parallel ray light beam from said condenser lens and that of the light beam emerging from said lens are substantially parallel to each other.

8. An optical head comprising
   a light beam source;
   a focussing lens for focussing the light beam emitted from said light beam source onto a disc; and
   a splitter prism which receives an incident beam of light that has been reflected from said disc, said incident beam having a predetermined cross-sectional area, said splitter prism having a reflecting surface and a transmitting surface which are positioned to spatially bisect the incident beam so as to provide two bisected light beam portions each having a respective cross-sectional area that is about half of the cross-sectional area of said incident beam, said splitter prism additionally having a converging lens for converging one of said bisected light beam portions.

9. An optical head as set forth in claim 8, wherein the optical path of the light beam from said light beam source is changed by a light beam splitter so that the light beam is irradiated onto said disc; said light beam reflected from said disc is passed straight through said light beam splitter and is spatially bisected by said splitter prism, which is positioned adjacent an emission surface of said light beam splitter from which said reflected light beam is emitted; and one of said bisected light beam portions is applied to a tracking photodetector to detect a tracking error signal, said photodetector being disposed so as to oppose said converging lens with said light beam splitter and said splitter prism interposed therebetween.

10. An optical head for use with an optical disc, comprising:
    a light beam source, the light beam source emitting light in a non-circular beam pattern having a minor axis and having a major axis that is greater than the minor axis;
    condenser means, having a condenser axis, for converging the light beam so that the rays thereof are parallel to the condenser axis;
    a magnifier prism having a first planar surface, a second planar surface, and a third planar surface between the first and second surfaces, the first surface being positioned to receive the light beam from the condenser means and being disposed at an oblique angle with respect to the condenser axis in order to refract the beam in such a manner that the minor axis of the light beam pattern is magnified and becomes substantially equal to the major axis, the third surface receiving the magnified light beam refracted by the first surface and reflecting the beam through the second surface, the third surface being positioned so that the beam propagates in a direction perpendicular to the condenser axis after reflection by the third surface;
    first and second photodetector means for detecting light; and
    directing means disposed between the second surface of the magnifier prism and the photodetector means for directing the beam of light toward the disc and for directing light reflected by the disc to the photodetector means.

11. An optical head as set forth in claim 10, wherein the first and second photodetector means are mounted at spaced apart positions, and wherein the directing means comprises a splitter prism having a fourth planar surface and a fifth planar surface adjacent the fourth surface, the fourth and fifth surfaces being positioned so that each receives at least some of the light reflected by the disc, the fourth surface reflecting substantially all of the light it receives toward the first photodetector means and the fifth surface transmitting substantially all of the light it receives to the second photodetector means.

12. An optical head as set forth in claim 11, wherein the splitter prism additionally has a sixth surface configured as a lens to focus light reflected by the fourth surface on the first photodetector means.

13. An optical head as set forth in claim 11, wherein the directing means further comprises a polarization beam splitter having first and second planar sides that are perpendicular to the disc and having third and fourth planar sides that are parallel to the disc, with the first side being joined to the second surface of the magnifying prism, the third side facing the disc, and the fourth side facing the splitter prism.

14. An optical head as set forth in claim 13, wherein the directing means further comprises a quarter wave plate and focussing means disposed between the third side of the polarization beam splitter and the disc.

15. An optical head as set forth in claim 13, further comprising another light beam source which emits light at a wavelength different from that of the light beam source, and means for directing light emitted by the another light beam source to the second side of the polarization beam splitter.

16. An optical head as set forth in claim 15, wherein the directing means further comprises a quarter wave plate and a filter disposed between the fourth side of the polarization beam splitter and the splitter prism, the filter transmitting light at the wavelength of the light beam source and reflecting light at the wavelength of the another light beam source.

17. An optical head as set forth in claim 16, wherein the means for directing light emitted by the another light beam source comprises a prism connected to the second side of the polarization beam splitter, a filter connected to the prism, and a condenser lens and a cylindrical lens disposed between the another light beam source and the filter connected to the prism.

* * * * *